United States Patent [19]

Morin et al.

[11] Patent Number: 5,364,529
[45] Date of Patent: Nov. 15, 1994

[54] WASTEWATER TREATMENT SYSTEM

[75] Inventors: Raymond N. Morin; Michael J. Weir, both of West Bend, Wis.

[73] Assignee: Level Valley Dairy Company, West Bend, Wis.

[21] Appl. No.: 993,714

[22] Filed: Dec. 18, 1992

Related U.S. Application Data

[63] Continuation-in-part of Ser. No. 694,982, May 1, 1991, abandoned.

[51] Int. Cl.$^5$ .............................................. C02F 3/20
[52] U.S. Cl. ...................................... 210/608; 210/624; 210/626; 210/195.3; 210/221.2; 210/259
[58] Field of Search ............... 210/608, 611, 615, 617, 210/623, 624, 626, 629, 704, 195.1, 195.3, 197, 202, 220, 221.2, 259, 257.1, 631, 705, 209

[56] References Cited

U.S. PATENT DOCUMENTS

| | | | |
|---|---|---|---|
| 2,368,055 | 1/1945 | Walker | 210/626 |
| 2,792,202 | 5/1957 | Griffith | 210/629 |
| 3,047,492 | 7/1962 | Gambrel | 210/625 |
| 3,133,878 | 5/1964 | Kober | 210/626 |
| 3,386,910 | 6/1968 | Forrest | 210/624 |
| 3,397,139 | 8/1968 | Sak | 210/609 |
| 3,574,331 | 4/1971 | Kurosawa et al. | 210/195.3 |
| 3,730,881 | 5/1973 | Armstrong | 210/195.3 |
| 3,876,536 | 4/1975 | Pradt et al. | 210/609 |
| 3,886,065 | 5/1975 | Kappe et al. | 210/620 |
| 3,951,758 | 4/1976 | Pörsch | 210/629 |
| 4,211,645 | 7/1980 | Zajic et al. | 210/626 |
| 4,225,431 | 9/1980 | De Longe | 210/624 |
| 4,282,256 | 8/1981 | Evich et al. | 210/623 |
| 4,370,235 | 1/1983 | Suzuki et al. | 210/631 |
| 4,374,027 | 2/1983 | Severeid et al. | 210/608 |
| 4,406,790 | 9/1983 | Birkner | 210/612 |
| 4,406,795 | 9/1983 | Takacs et al. | 210/771 |
| 4,460,470 | 7/1984 | Reimann et al. | 210/195.3 |
| 4,728,517 | 3/1988 | Markham et al. | 210/623 |
| 4,786,413 | 11/1988 | Reimann et al. | 210/623 |
| 4,787,978 | 11/1988 | Nicol | 210/624 |
| 4,874,519 | 10/1989 | Williamson | 210/626 |
| 4,894,162 | 1/1990 | Cournoyer et al. | 210/631 |

FOREIGN PATENT DOCUMENTS 137921 10/1979 Germany.

OTHER PUBLICATIONS

Brian Appleton, "ICI's Deep Shaft 'Halves sludge volume'," Civil Engineer, Apr. 17, 1975, pp. 26–27.

Primary Examiner—Christopher Upton
Attorney, Agent, or Firm—Foley & Lardner

[57] ABSTRACT

A wastewater treatment system is provided which includes (a) two chambers in which microbiological cultures grow aerobically, a first chamber which receives wastewater to be treated and a second chamber which produces activated sludge; (b) a float sludge separator for removing from the system float sludge made with the aerobic culture from the first chamber; and (c) an activated sludge separator for separating activated sludge, which is settleable, and treated wastewater from the aerobic culture in the second chamber. In the system, one portion of the activated sludge from the activated sludge separator is fed to the first chamber, to seed culture growth there, and another portion of the activated sludge is recycled to the second chamber, to seed culture growth there.

59 Claims, 5 Drawing Sheets

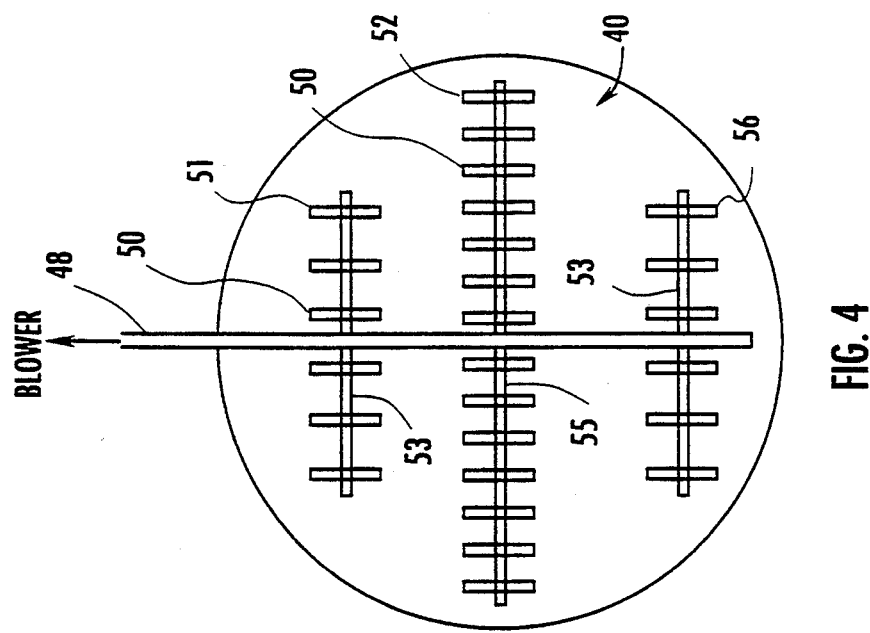

WASTEWATER TREATMENT SYSTEM

RELATED APPLICATION

This is a continuation-in-part of application Ser. No. 694,982, filed May 1, 1991, now abandoned.

TECHNICAL FIELD

This invention relates generally to wastewater management, and specifically, to treatment of wastewater to reduce its objectionable properties to levels acceptable for discharge into sewage systems or the environment. The invention is particularly well suited for treatment of wastewater containing high quantities of carbohydrate, together with some fat and protein, as results from dairies, cheese-making operations or other milk-processing or food-processing facilities.

BACKGROUND OF THE INVENTION

Ultimately, wastewater, or spent water, must be returned to the land or the waters. Considerable engineering research and development has focused on the complex question of which contaminants occur in wastewater and the extent to which they must be removed to protect the environment.

In recent years, much of this research and development has been directed to the treatment of wastewater resulting from processes employed in industrial plants. The variety and amount of industrial wastes discharged into the environment and into municipal sewage systems has increased significantly during the past few decades. The concentration of contaminants in these wastes is often very high, and regulations for environmental protection now require that industrial wastes be treated at their point of generation to reduce their contaminant concentration to an acceptably low level before allowing their discharge into municipal treatment systems or the environment. Management of such wastes requires analysis of the particular local conditions, the degree of contaminant removal (treatment) required before the wastewater can be reused or discharged to a larger (municipal) system or discharged to the environment, and the operations and processes necessary to achieve that required degree of treatment.

The characterization of a particular wastewater depends on its physical, chemical and biological constituents. The most important physical characteristic of wastewater is its total solids content, which is the total amount of matter in suspension, colloidal matter, and matter in solution. The total solids content is defined as all the matter that remains as residue upon evaporation of the wastewater to dryness at 103° to 105° C.

The total solids can be subclassified as suspended solids and filterable solids. Suspended solids include settleable solids and all floating materials, whether floating on the surface or in the body of the wastewater, while filterable solids include the colloidal and dissolved solids. The colloidal solids cannot be removed by settling, but usually require biological oxidation or coagulation followed by sedimentation for removal from the wastewater. The dissolved solids consist of both organic and inorganic molecules and ions that are present in true solution in the water. Other physical characteristics include temperature, color and odor.

The chemical constituents of wastewater are typically divided into three categories, organic matter, inorganic matter and dissolved gases. Organic matter generally includes proteins, carbohydrates, fats, oils, and greases, surfactants, pesticides, herbicides and other agricultural chemicals and substances. Inorganic matter usually includes minerals and inorganic ions, such as phosphates. Gases commonly found in wastewaters include nitrogen, oxygen, carbon dioxide, hydrogen sulfide, ammonia and methane. The latter three gases are usually derived from the decomposition of the organic matter present in the wastewater.

The biological constituents of wastewater include the microorganisms found in the wastewater. These microorganisms include protista, such as bacteria and protozoa. As explained hereinafter, biological treatment of wastewater depends on the establishment and maintenance in a treatment system of a population of naturally occurring microorganisms adequate to perform oxidation of the organic matter.

The objectionable properties of wastewater derive, in large part, from the organic matter. Organic matter may be "stable" or "unstable". Stable compounds are fairly resistant to bacterial breakdown, while unstable are not. The objective of treatment of the organic matter is to stabilize the organic matter by oxidation, and a measure of the amount of oxygen required to accomplish this action gives a measure of the amount of organic matter contaminating the wastewater.

The most common measure of organic pollution of wastewater is the biochemical oxygen demand (BOD). The BOD is the quantity of dissolved oxygen required by microorganisms for biochemical oxidation of the organic matter in a given time at a given temperature. The efficiency of a treatment system is usually evaluated on the basis of BOD removal by the system. The BOD is usually given as $BOD_5$, the biochemical oxygen demand for five days at 20° C. The BOD is typically given in milligrams/liter (mg/l) or parts per million (ppm). For dilute systems, in which a liter of wastewater has a mass nearly equal to a kilogram, the mg/l unit is interchangeable with ppm.

A $BOD_5$ of about 200–400 mg/l is typically required in a wastewater for it to be acceptable for discharge into a sewage system, such as a municipal (i.e., a community, public or governmental) system, where additional treatment will further reduce $BOD_5$, e.g., typically to levels acceptable for discharge into streams, lakes, or other bodies of water in the environment. A $BOD_5$ of less than about 5–10 mg/l is typically required for treated wastewater to be acceptable for discharge directly into the environment (e.g., a stream or lake).

Another wastewater contaminant, which is of considerable concern with respect to quality of water discharged to the environment, is phosphates. A phosphate concentration of less than about 1 mg/ml (i.e., 1 ppm) as $PO_4^{-3}$ is desirable, and may be required, for treated wastewater to be acceptable for discharge directly into streams, rivers, lakes, or the like, in the environment.

Contaminants in wastewater are removed by physical, chemical and biological methods. Physical methods include sedimentation (settling), filtration and floatation. Sedimentation is the simplest and most widely used physical treatment method. Much of the organic matter in wastewater is in a suspended form rather than in solution and removal of the sediment or sludge brings about a large reduction in BOD of the wastewater.

Filtration serves the same purpose as sedimentation. Suspended and colloidal solids in wastewater may be removed by filtration, a process which allows the water to pass through a bed of, e.g., sand, or a combination of granular materials. The removal of substances appears to be a combination of physical and chemical processes, such as straining phenomena and adsorption. Filtration is faster than sedimentation, requires less space, and the retained solids contain less water.

Floatation is used to concentrate oils, grease, and fine dispersed solids on the surface of the wastewater. For oils and grease, a grease trap or skimming tank is common. Such a device is simply a detention tank which reduces the flow velocity of the wastewater and allows time for oil and grease globules to rise to the surface and collect as an oil layer during the period that the wastewater, with reduced flow rate, is detained in the tank. Removal can be effected by scraping techniques. Dissolved air floatation (DAF) methods are also used to promote flocculation and remove a surface or float sludge. Minute bubbles of air are used to bring finely dispersed solids, including microorganisms, to the surface of the wastewater where they are removed by skimming or scraping techniques. The flocculation may be aided by a flocculating or coagulating agent, as is explained hereinafter.

Chemical methods include neutralization and aeration/oxidation. An important factor in the treatment of all aqueous wastes is to produce a final effluent with a neutral pH of approximately 7. Many industrial operations produce acidic (low pH) or alkaline (high pH) wastewaters. Various substances must be added to bring the pH into the neutral range.

Aeration is a process used in nearly all types of wastewater treatment. Aeration is used to provide dissolved oxygen for biological oxidation of the organic matter by microorganisms, but aeration also facilitates release of certain volatile substances to the atmosphere and is effective in removing certain other organic compounds by oxidation, such as phenols, sulfides and sulfites. Aeration may also be used to make a float sludge by adding buoyancy to sludge particles with bubbles of air.

Biological methods of waste treatment constitute the most common and widely used methods because they are the most economical means of accomplishing an acceptable final effluent. They utilize naturally occurring microorganisms to accomplish results which would be quite costly if attempted by chemical or mechanical means. The microorganisms are used to bring about a breakdown of complex organic compounds primarily by oxidation (and hydrolysis). Complete aerobic decomposition results in compounds which, under ordinary conditions of temperature and pressure, are stable, e.g., water, carbon dioxide, nitrogen, chlorides, nitrates, etc.

One aerobic process is the use of a trickling filter. The trickling filter consists of a bed of highly permeable media to which microorganisms are attached and through which the wastewater is percolated. The microorganisms covering the surface of the filter media use the wastewater as a food source. The surface area of the media supporting the growth of organisms is the effective part of the system. The biological growth and activity depend on a constant supply of dissolved oxygen. The effluent from the filter carries with it living and dead organisms and waste products of the biological reactions. These sludge flocs are indicators of the efficient functioning of the trickling filter and are separated from the water in settling tanks.

Another aerobic process is the activated sludge method which is the most widely used method to bring about stabilization in wastewater having organic matter constituents. The method depends on establishing and maintaining a population of degrading microorganisms and providing close contact of the degrading microorganisms and a supply of dissolved oxygen. The microorganisms feed and grow upon the oxidizable material in the wastewater and form a suspended floc of "activated sludge" in the water. Air bubbled through the water or absorbed by constantly renewing the air-water interface (by agitation) replenishes the oxygen needed for the biological oxidation. The mixture of wastewater and activated sludge, known as "mixed liquor", is then settled to separate the activated sludge solids from the treated (i.e., reduced BOD) water. The settled activated sludge is usually mechanically returned (by pump) to the aeration site (usually a tank or vessel).

The solids in an activated sludge system tend to build up due to accumulation of inert material and the growth of the microorganisms. To control the amount of solids during aeration, the excess solids, i.e., "excess sludge", are wasted from the system regularly. Typically, the influent wastewater is mixed with about 20 to 30 percent by volume of activated sludge and approximately the same number of pounds of suspended solids which enter the treatment system each day must be wasted as excess activated sludge.

Disposal of the excess activated sludge usually requires additional treatment of the sludge because the BOD of the sludge may run higher than 3000 mg/l. Generally, the excess sludge is "digested" aerobically or anaerobically, i.e., conversion of the organic matter in the sludge to more stable compounds. Digestion operates when available food for the microorganisms is at a minimum and the microorganisms are in the endogenous phase, where they are forced to metabolize their own protoplasm as a food source. Digestion is generally followed by drying, lagooning, wasting on farm lands, or trucking to larger waste treatment facilities.

The activated sludge method, while the most widely used treatment method, has several operational problems. In conventional activated sludge facilities, the aerators are of a fixed size and are designed to give an average detention period of 6 to 8 hours for aeration, with a return activated sludge rate equal about 20 to 30 percent of the influent wastewater flow. Aeration tanks utilized for the aeration are usually shallow with small cross-sectional area. Unfortunately, average conditions do not generally exist. The flow of wastewater often fluctuates between high flows and low flows. For example, an industrial plant may have peak loads during the day and minimum loads at night and on weekends. The concentration of contaminants typically also fluctuates; often the highest flow will have the highest concentration of contaminants. The matching of food to microorganism, i.e., the fluctuating biological load to the weight of sludge retained, can be a difficult problem.

Another problem is sludge bulking in which a large volume of light, fluffy sludge forms which does not settle. One type of bulking is due to the presence of filamentous microorganisms, such as filamentous bacteria, for example, Sphaerotilus or Leptothrix bacteria, and their growth in excessive numbers causes the sludge to be less dense. (A low density sludge will float.)

Another problem is rising sludge which can occur from overaeration (i.e., quantity of air is too large or aeration period is too long). In this phenomenon, the sludge is initially dense and settles well, but rises in chunks and floats on the surface of the water. This condition is associated with production of nitrogen gas from nitrates and nitrites in the water.

Many modifications of the simple activated sludge process have been described to control some of the operational problems as well as add flexibility and tolerance to a system. Some modifications have attempted to control fluctuations in the quantity and quality of wastewater influent. For example, flow equalization tanks have been described and used which have a sufficiently large capacity to hold the incoming wastewater and provide more uniform composition of the wastewater, and permit an even flow to the aeration/biological oxidation site, preventing "shocking", i.e., sudden increases in contaminant concentration, which can be very deleterious to the microorganisms. See, for example, U.S. Pat. No. 4,894,162 for use of such a tank; see, also, U.S. Pat. No. 3,886,065 which describes a method of metered discharge of final effluent with aeration and clarification vessels capable of receiving widely fluctuating flow rates.

Other modifications have attempted to vary the aeration conditions. Such modifications include contact stabilization, extended aeration and the Kraus process. In contact stabilization, the mixed liquor enters a contact tank where it is aerated for about 30 to 90 minutes, the sludge is then separated and the return sludge aerated in a sludge aeration tank for 3 to 6 hours before being mixed with the influent wastewater. Extended aeration is a process used for low organic loading and long aeration time. Extended aeration works on the endogenous phase of the microorganism growth curve. In the endogenous phase, the microorganisms are forced to metabolize their own protoplasm. Lysis occurs, by which nutrients remaining in dead cells diffuse out to furnish food for the remaining cells. The Kraus process includes a reaeration of a mix of return sludge, digested sludge and digester supernatant prior to mixing with the influent wastewater and its aeration.

Yet another modification includes the use of deep tank aeration. U.S. Pat. Nos. 3,574,331 and 4,374,027 describe the use of deep tanks in which air (or oxygen) is supplied at the bottom of the tank where the hydrostatic pressure of the fluid in the tank is high. The high hydrostatic pressure is described as facilitating and accelerating oxygen transfer to the microorganisms present in the fluid in the tank, providing more efficient processing than in shallow tanks of equal volume.

Various techniques have been described to improve sludge formation and separation from the water. For example, U.S. Pat. Nos. 4,728,517 and 4,282,256 describe dissolved air floatation techniques in which air is dissolved in the mixed liquor under pressure and then allowed to come out of solution in a vessel at atmospheric pressure to produce a float sludge. U.S Pat. No. 4,728,517 injects compressed air in line along with coagulating and flocculating agents, while U.S. Pat. No. 4,282,256 pressurizes the mixed liquor in line but holds it in a retention tank under pressure before release to the flotation tank. U.S. Pat. No. 4,786,413 describes an activated sludge system in which a support material is added to an aeration tank to facilitate flocculation of microorganisms for subsequent settling of the sludge. U.S. Pat. No. 4,406,790 describes use of an aeration tank in which the surface of the contained fluid is heated, preferably by steam, to facilitate bacterial action.

Several methods for treatment of excess sludge have been described. U.S. Pat. No. 3,047,492 describes an activated sludge system with aerobic sludge digestion and chlorination of the water before final discharge to the environment. U.S. Pat. No. 4,406,795 describes a heat/extraction method for separating the solids from the liquid in sludge. U.S. Pat. No. 3,876,436 describes a sludge treatment consisting of wet air oxidation followed by biological oxidation in the presence of activated carbon. U.S. Pat. No. 4,370,235 describes a sludge treatment in which aerobic digestion is preceded by decomposition of the microorganisms present in the sludge, e.g., by treatment with ozone.

Still other modifications include pretreatment of wastewater with neutralizations and flocculating agents prior to a conventional activated sludge circuit (see, Pat. No. 4,894,162), a rapid settling technique to produce low phosphorous compound content effluent (see, U.S. Pat. No. 3,386,910) and use of various polymers for improving sludge formation and processing (see, U.S. Pat. No. 3,397,139).

As described hereinbefore, some industrial wastewaters result in highly concentrated organic loadings and may have high phosphate concentrations (more than about 50 ppm). Such wastes include those derived from meat-packing plants and food-processing, including milk-processing (e.g., dairies, cheese-making), plants. These wastes are particularly conspicuous as having a very high oxygen requirement (BOD) and being especially susceptible to anaerobic decomposition if sufficient oxygen is not provided. For example, wastewaters with high carbohydrate content are especially unstable and susceptible to anaerobic decomposition.

The biological treatment of such wastewaters to reduce BOD has been problematic. In particular, treatment of dairy and other milk-processing wastewater has historically been difficult. Such wastewater has a high carbohydrate content, which favors the growth of bacteria of species of the Sphaerotilus-Leptothrix group found in the wastewater. As described hereinbefore, these bacteria form a filamentous bulking. This bulking tendency has been regarded as a problem in design and operation of systems to treat such wastes because of the high likelihood of producing a floating sludge. Most treatment methods for milk-processing or food-processing wastewater are directed to controlling this bulking. As such, biological treatment of such wastewaters, because of their inherent qualities, remains difficult and expensive. The art has yet to respond with a simple, cost effective, efficient system for reliable treatment.

SUMMARY OF THE INVENTION

The present invention provides a wastewater treatment system that utilizes naturally occurring microorganisms, including their bulking properties, with surprisingly improved capability to provide a treated wastewater of significantly reduced BOD and suspended solids content in comparison with the contaminated wastewater entering the system for treatment. The invention also encompasses the wastewater treatment apparatus, into which contaminated wastewater flows for treatment by the system of the invention and from which wastewater treated by the system of the invention flows into the environment or another system or apparatus for further treatment. The invention also entails the method of using the system and apparatus of the invention in treating wastewater and an aeration chamber that is especially well suited for use in the system of the invention and as an element in the apparatus of the invention.

The wastewater treatment system of the invention includes (a) two chambers in which fluid is extensively aerated and microbiological cultures grow aerobically, a first chamber which receives wastewater to be treated and a second chamber which produces a combination of a settleable, activated sludge and an effluent which is suitable as a treated wastewater; (b) a float sludge separator for removing from the system float sludge made with the aerobic culture from the first chamber; and (c) an activated sludge separator for separating the activated sludge and treated-wastewater effluent from the aerobic culture in the second chamber.

In the system of the invention, one portion of the activated sludge from the activated sludge separator (a "clarifier") is fed to the first chamber, to seed culture growth there, and another portion of the activated sludge (usually the remainder not fed to the first chamber) is recycled to the second chamber, to seed and feed culture growth there. The fraction of activated sludge fed (or "wasted") from the clarifier to the first chamber is preferably adjusted so that a parameter, such as settleable solids or BOD, in the culture in the second chamber, remains, during continuous operation of the system, within a steady-state range or near a steady-state value that has been pre-determined empirically to indicate that the system is operating acceptably, to yield treated wastewater that is acceptable for discharge into another treatment system, such as a municipal sewage treatment system, if that is the purpose of the system of the invention, or, preferably, to yield treated wastewater that is acceptable for discharge to the environment. Those of skill in the art can readily determine the steady-state range or value of the parameter of interest to achieve acceptable operation of a particular system and can readily adjust the fraction of activated sludge that is fed to the first chamber in order to maintain the parameter within the pre-determined steady-state range or acceptably near the pre-determined steady-state value.

In an important aspect, the cultures in the two chambers are extensively aerated so as to be maintained under aerobic culture conditions. Preferably, also, fluid elsewhere in the system, such as in the float-sludge-separator, is extensively aerated to maintain aerobic conditions both in the float sludge and in the fluid remaining after separation of the float sludge. In a preferred aspect, activated sludge does not accumulate in the activated-sludge-separator but is fed back to the first chamber or recycled to the second chamber as it settles from second culture in the activated sludge separator.

Further, in a preferred embodiment, an aqueous solution comprising a ferric salt is added, along with flocculating or coagulating agent required to form the float sludge, to the culture in the float-sludge separator. It has been found that such addition of a ferric salt has the effect of reducing, to a surprising extent, the phosphate concentrations in the effluent from the float-sludge separator and the effluent, which is treated wastewater, from the second chamber in comparison with the phosphate concentration in the first aerobic culture that flows into the float-sludge separator. This reduction in phosphate concentrations can be accomplished with only the simple addition of an aqueous solution of a ferric salt, as indicated above, and does not require major capital expenditure for special apparatus that have been employed in the art for phosphate removal.

In effect, in a system of the invention, contaminated wastewater flowing into the system provides nutrients for the first aerobic culture in the first chamber; microorganisms (many of which are filamentous and can have bulking properties) grown in this first culture are separated with float sludge and so removed from the system along with various contaminants they accumulate during growth; microorganisms which pass through the float sludge separator enter the second aerobic culture in the second chamber, said second culture primarily providing seed (as part of activated sludge) to promote the growth of the cultures in the first and second chambers and an effluent, which is left after settling of activated sludge from the second culture. All or part of this effluent is discharged from the system (optionally after further treatment) as treated wastewater.

The system of the invention can be operated continuously over extended periods of time. The system can be operated with the various components at different temperatures, provided that freezing that would block flow of fluid through the system does not occur and microorganisms required for operation of the system remain viable. Operating temperatures between about 40° F. and about 95° F., more preferably between about 50° F. and about 85° F., are suitable.

The system of the invention can be employed as a pre-treatment system or a final-treatment system. In a pre-treatment system, the treated wastewater provided by the system (with $BOD_5$ and suspended solids both of less than about 400 mg/l and more typically less than about 200 mg/l) is acceptable for dumping into another (e.g., municipal) system for further treatment prior to discharge to the environment. In a final treatment system, the treated wastewater provided by the system is acceptable for discharge directly to the environment (i.e., $BOD_5$ and suspended solids both less than 10 ppm). The treated wastewater provided by one embodiment of a system of the invention can also have phosphate concentrations of less than 5 ppm and, more typically, less than about 1 ppm. Phosphate concentrations of less than 0.2 ppm can be achieved.

A system of the invention does not require, but may optionally have, a number of devices. Thus, a system may have a means for holding sludge removed from the float-sludge separator. Such a sludge-holding means will preferably be fit with an aeration means to keep the held sludge aerobic until removed for ultimate disposal (e.g., with sludge from the system of the invention, by dumping in a farmer's field). A system may also be equipped with a grease-trapping means for removing fatty or oily substances or the like from wastewater before the waste- water enters the first culture. A system of the invention may also have a means for aerating effluent from the float sludge separator before said effluent enters the second culture in the second chamber. Such a means may be a trickling filter tower, sometimes referred to in the art as a roughing tower or a biotower. Similarly, particularly in systems of the invention intended for discharge of treated wastewater directly to the environment, there may be a means for filtering effluent from the separator, in which water for discharge is separated from activated sludge, prior to discharge of the effluent to the environment. As well known in the art, a sand filter can be employed as this filtering means. Further, optionally, in using a system of the invention, water (second effluent) from the activated sludge separator of the system may be combined with clean water and the combination discharged to the environment (or another treatment system). It is not necessary that all of the water resulting from separation of activated sludge from second culture in the activated sludge separator be discharged from the system; a portion of this water may be recycled into the system, e.g., into the first chamber or the wastewater input stream that flows into the first chamber. A system of the invention may also include means for monitoring and adjusting pH in various compartments of the system (e.g., the first culture), means for controlling rates of flow of fluid into and out of various compartments (e.g., out of the first chamber), means for automatically adjusting the pressure of air being input from an aerating means into a fluid in a compartment of the system (e.g., the first or second chamber) to maintain this pressure just slightly above the hydrostatic pressure at the point where the air is entering the fluid, and numerous other optional means and devices that the art-skilled will recognize.

The invention also encompasses a method of treating a contaminated wastewater to produce a treated (or, as explained above, pre-treated) wastewater of substantially reduced suspended solids content and substantially reduced BOD, said method comprising passing the contaminated wastewater into an operating treatment system of the invention. As indicated above, treated wastewater obtained by passing contaminated wastewater into an operating system of the invention can also have other desirable properties, such as a low phosphate concentration.

The invention further includes an aeration chamber for a wastewater treatment system of the type of the present invention. The chamber of the invention comprises an aeration tank which is substantially cylindrical and has a ratio of radius to maximum depth of fluid aerated in the tank of greater than 1. Such a tank advantageously has a large fluid surface exposed, to promote aeration with air from the atmosphere of the fluid when the fluid is stirred or agitated. Further, again to further thorough aeration of fluid in the tank, the chamber may have an array of air diffusers located proximate the bottom end of the tank, from which preferably small air bubbles enter the fluid and float to the surface, both delivering air to the fluid and causing significant agitation in the fluid. In a preferred embodiment, the diameter of the tank will be such that the hydrostatic pressure at the bottom of the tank at the maximum depth of fluid in the tank will not exceed about 7 p.s.i.g. but will generally be greater than about 2 p.s.i.g. In addition to the tank and the aerating means, including the diffusers and means for maintaining air pressure in the diffusers high enough to prevent flow of fluid from the tank into the diffusers and means for pumping air to the diffusers and out of the diffusers into the culture in the tank, the chamber of the invention will be joined to a pipe or conduit, through which fluid comprising wastewater will flow into the tank, and another pipe or conduit, through which first culture will leave the tank for the float-sludge-separator. The tank may be substantially completely open to the atmosphere at the top end. Such a chamber of the invention will be economical and will provide for adequate aeration to maintain aerobic culture conditions in a first culture in a system of the invention.

The system of the present invention has been found unexpectedly to have several significant advantages over prior art wastewater treatment works. A major advantage is that systems of the invention can economically achieve what systems in the art, particularly those associated with food-processing or milk-processing, have not achieved despite years of costly effort: removal from wastewater of greater than 99.5% of BOD and suspended solids and also, in one aspect, removal of phosphate to levels that permit discharge of treated waters directly to the environment. Other advantages include easier operation, as the system is more stable than prior art systems and can accommodate various changing conditions (e.g., rapidly varying volume or BOD of inflowing wastewater) without need for extensive operator intervention; lower sludge production (typically reduced by more than half); ease in producing only aerobic sludge (as compared with the inevitable production of both aerobic and anaerobic sludge in the art); lower capital cost (e.g., by avoiding the need for a trickling filter tower); lower operating costs due to, e.g., reduced sludge production, absence of need to dispose of anaerobic sludge, reduced usage of flocculating polymer in sludge formation, and reduced labor costs because of easier operation; reduced land usage; and substantial absence of odor.

The present system advantageously uses the natural bulking or aggregating properties of micro-organisms present in the aerobic culture of the first chamber to facilitate formation of the float sludge. The system, relying on extensive aeration, does not present problems of overaeration experienced with prior art systems.

The present system is especially suitable for treating influent wastewater with large quantities of carbohydrate, together with some fat and protein. Such wastewater is produced, for example, by dairies, food-processing plants, including milk-processing plants (e.g., cheese factories, butter production facilities, butter-fat processing operations), and the like. Typical BOD's of contaminated wastewater flowing into the first culture of a system of the invention will be between about 1000 mg/l to about 10,000 mg/l. Phosphate concentrations in such wastewater will be between about 20 mg/l to about 200 mg/l, and usually between about 50 mg/l and 100 mg/l, as $PO_4^{-3}$.

Other advantages and a fuller appreciation of the physical attributes and structural adaptations and variations of the present invention will be gained upon an examination of the following detailed description of the invention, taken in conjunction with the drawings which accompany it.

BRIEF DESCRIPTION OF THE DRAWINGS

Exemplary embodiments will hereafter be described in conjunction with the appended drawings, wherein like designations denote like elements, and in which:

FIG. 2 is a schematic sectional view of a grease trap that may be employed in a system in accordance with the present invention;

FIG. 3 is a cross-sectional view of the aeration tank 14 useful as the first chamber in the system of FIG. 1;

FIG. 4 is a sectional view of the air diffuser array of aeration tank 14 illustrated in FIG. 3, taken along a plane which is perpendicular to the direction of the blower line 48;

DETAILED DESCRIPTION OF THE INVENTION

Figure 1:
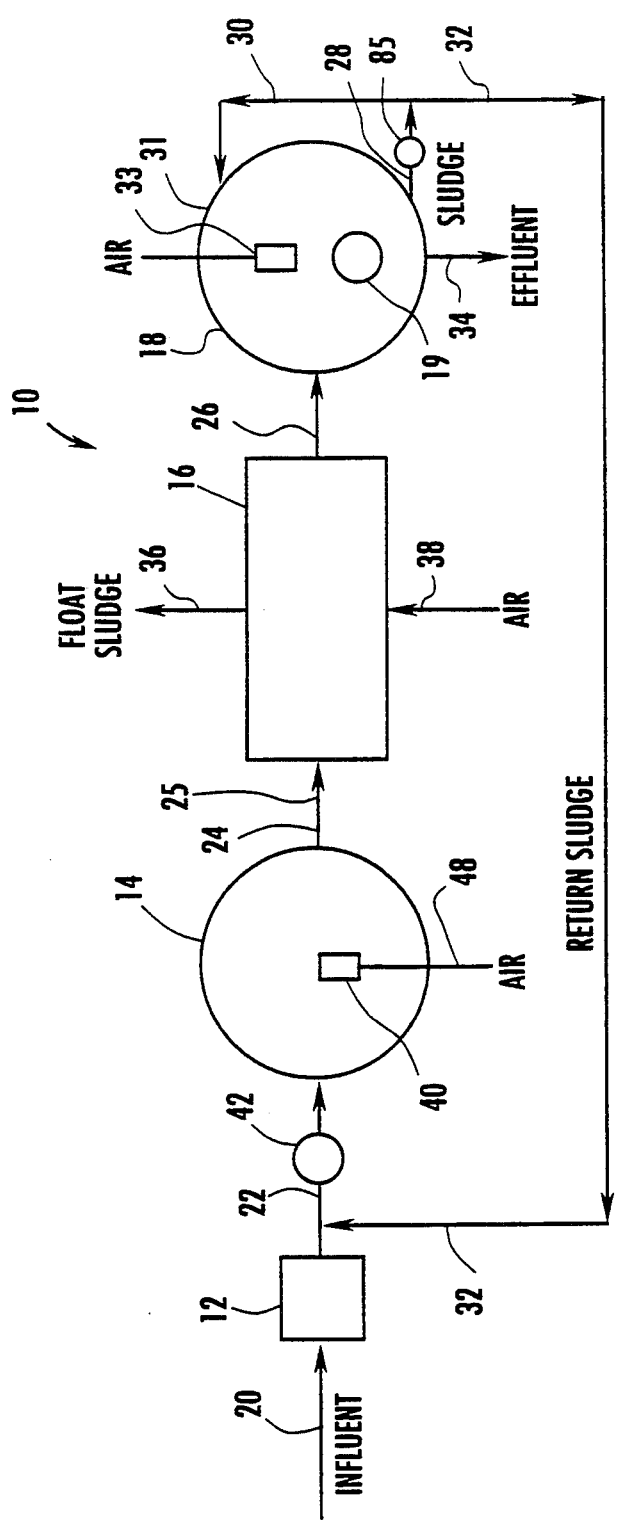
FIG. 1 is a schematic diagram illustrating one embodiment of the treatment system according to the present invention.

This invention relates to a wastewater treatment system in which, at every stage in which waste-degrading microorganisms occur, conditions for aerobic culture of the microorganisms are maintained. The invention relates also to a wastewater treatment apparatus, into which a contaminated wastewater flows for treatment in accordance with the system of the invention and from which wastewater, that has been treated in accordance with the system of the invention, flows, into the environment or into another system or apparatus for further treatment. Further, the invention relates also to a method of using the system and apparatus of the invention to obtain a treated wastewater from a contaminated wastewater fed to the system and apparatus.

The system is particularly well suited for wastewaters which are high in carbohydrates, such as lactose, together with small quantities of proteins, fats and oils. Such a composition of wastewater is typically found in the wastewaters from dairies and other milk-processing facilities. While the volume of wastewaters from such facilities is not particularly large, these waters are generally very high in BOD, which may, as $BOD_5$, reach above 10,000 mg/l (ppm). As indicated above, the phosphate concentration of such wastewaters can also be high, reaching above 100 mg/ml as $PO_4^{-3}$. It should be appreciated, however, that the system of the present invention is not limited in its application to such wastewater and is applicable to a broad spectrum of wastewater treatment and waste management.

One wastewater treatment system according to the present invention includes a first chamber (aeration tank), which may also serve as an equalization tank and in which aeration and biological oxidation occur; a first separator (float-sludge-separating means) in which separation of float sludge from culture fluid received from the first aeration tank occurs and which is connected in series to a second aeration tank (second chamber), which may be an extended aeration chamber or "main digester" as understood in the art, and a second separator (activated sludge separating means), such as a clarifier as known in the art, in which separation of activated sludge from culture fluid received from the second aeration tank occurs by settling, with at least a portion, and typically at least about 90%, of the effluent left after settling of the activated sludge discharged from the system through a discharging means, optionally after further filtering, as treated wastewater. The effluent, which is formed in the second separator after separation of the sludge and is not discharged from the system, is fed back into the system. Preferably in operation of the system (which proceeds continuously over extended periods of time on the order of months or longer), there is complete recycling of the sludge from the second, downstream separator (clarifier) to the second aeration chamber (which will usually receive between 85% and 95%, and more typically about 90%, of the sludge back) and to the first, upstream aeration tank, and there is removal (via a float-sludge-removal means) and ultimate disposal of the float sludge produced in the first clarifier, typically a DAF unit, upstream from the second aeration tank and downstream from the first aeration tank. As indicated above, the fraction of activated sludge fed (wasted) from the second separator (clarifier) to the first aeration tank is preferably adjusted to maintain a parameter, such as settleable solids or BOD, of the culture in the second aeration tank during continuous operation of the system, within a steady-state range or near a steady-state value that has been predetermined to allow the system to operate effectively in producing acceptably treated wastewater.

With more particularity, in one of its aspects the invention is a wastewater treatment system, comprising: a first chamber, a float-sludge-separating means, a float-sludge-removing means, a second chamber, an activated-sludge-separating means, a first activated-sludge-return means; a second activated-sludge-return means; and a fluid discharging means;

said first chamber (i) receiving wastewater from a wastewater source, (ii) detaining fluid that enters said first chamber for a first detention period, (iii) comprising a first aerating means for aerating fluid in said first chamber, and (iv) holding a first aerobic culture of a first biological oxidizing means, said first culture employing constituents of wastewater received into said first chamber as nutrients and receiving as seed microorganisms in activated sludge returned to said first chamber via said first activated-sludge-return means from said activated-sludge-separating means;

said float-sludge-separating means receiving said first aerobic culture from said first chamber and comprising (i) means for combining a flocculating polymer with first aerobic culture received into said float-sludge-separating means, and (ii) a second aerating means for aerating fluid in said float-sludge-separating means and for providing air bubbles for separation of a float sludge from said combination of first aerobic culture and said flocculating polymer in said float-sludge-separating means, with the production of said float sludge from said combination, leaving a first effluent;

said sludge-removing means being employed for removing said float sludge from said float-sludge-separating means to outside the system;

said second chamber (i) receiving said first effluent from said float-sludge-separating means, (ii) detaining fluid that enters said second chamber for a second detention period, (iii) comprising a third aerating means for aerating fluid in said second chamber, and (iv) holding a second aerobic culture of a second biological oxidizing means, said second culture employing constituents of said first effluent received into said second chamber as nutrients and receiving as seed microorganisms in activated sludge returned to said second chamber via said second activated-sludge-return means from said activated-sludge-separating means;

said activated-sludge-separating means receiving said second aerobic culture from said second chamber, said activated sludge formed from separation in said activated-sludge-separating means by settling from said second aerobic culture in said activated-sludge-separating means, leaving a second effluent;

said first return means being employed to return a first portion of the activated sludge from said activated-sludge-separating means to said first chamber to provide microorganisms as seed for said first aerobic culture in said first chamber;

said second return means being employed to return a second portion of the activated sludge from said activated-sludge-separating means to said second chamber to provide microorganisms as seed for said second aerobic culture in said second chamber; and said fluid discharging means being employed to discharge at least a portion of said second effluent from said activated-sludge-separating means to outside the system.

As understood in the art, the various units of the system may be joined by conveying means, which will comprise conduits, such as tubes, pipes or the like, and possibly pumps, for moving fluid from one unit to another or from a component of the system to outside the system. "Fluid discharging means" and "return means" are, as will be clear to the skilled, types of conveying means.

The first and third aerating means will typically comprise diffusers as described below, and a means, such as a blower, pump, compressor, or the like, for supplying pressurized air to the diffusers. The second aerating means may be a means similar to that just described for the first and third aerating means or may comprise a mixer for injecting air under pressure into a flowing fluid, means for providing fluid from a chamber to the mixer for air injection, and means for carrying fluid with injected air from the mixer back to the chamber for release into the chamber. An aerating means may be simply a stirrer to agitate fluid to cause the fluid to incorporate air from the atmosphere. Alternatively, an aerating means may simply comprise a conduit, such as a pipe, with one end open and inside a chamber with a composition to be aerated and the other end joined to a means, such as a blower, for forcing air into and through the conduit for discharge from the open end of the conduit into the chamber (or directly into the composition to be aerated in the chamber.

The float sludge separating means can also comprise a means for combining an aqueous solution comprising a ferric salt, such as ferric sulfate, a ferric alum, or ferric chloride, with first aerobic culture received into the float sludge separating means. This means, for combining with first aerobic culture an aqueous solution of a ferric salt, can be the same as or separate from the means for combining with such culture the flocculating polymer. The aqueous ferric salt solution and flocculating polymer can be combined simultaneously or separately with the first aerobic culture. In one embodiment, aqueous ferric salt solution and flocculating polymer can be combined with first aerobic culture in a single mixing chamber, although the ferric salt solution and flocculating polymer are introduced into the mixing chamber through separate inlets or conduits, which, in turn, are different from the inlet or conduit through which first aerobic culture enters the mixing chamber. Flocculating polymer and, if employed, aqueous ferric salt solution will preferably be added continuously to a system of the invention, while the system is operating, for mixing or combination with first aerobic culture.

Further, the invention encompasses a method of treating a contaminated wastewater to provide a treated wastewater, which has a substantially lower concentration of suspended solids and substantially lower BOD than the contaminated wastewater, said method comprising passing the contaminated wastewater into a wastewater treatment system, said system comprising: a first chamber, a float-sludge-separating means, a float-sludge-removing means, a second chamber, an activated-sludge-separating means, a first activated-sludge-return means; a second activated-sludge-return means; and a fluid discharging means;

said first chamber (i) receiving the contaminated wastewater passed into the system from a contaminated wastewater source, (ii) detaining fluid that enters said first chamber for a first detention period, (iii) comprising a first aerating means for aerating fluid in said first chamber, and (iv) holding a first aerobic culture of a first biological oxidizing means, said first culture employing constituents of said contaminated wastewater received into said first chamber as nutrients and receiving as seed microorganisms in activated sludge returned to said first chamber via said first activated-sludge-return means from said activated-sludge-separating means;

said float-sludge-separating means receiving said first aerobic culture from said first chamber and comprising (i) a second aerating means for aerating fluid in said float-sludge-separating means and (ii) means for combining a flocculating polymer with first aerobic culture received into said float-sludge-separating means, provided that a float sludge is produced from the combination of first aerobic culture and said flocculating polymer in said float-sludge-separating means, with the production of said float sludge from said combination, leaving a first effluent;

said sludge-removing means being employed for removing said float sludge from said float-sludge-separating means to outside the system;

said second chamber (i) receiving said first effluent from said float-sludge-separating means, (ii) detaining fluid that enters said second chamber for a second detention period, (iii) comprising a third aerating means for aerating fluid in said second chamber, and (iv) holding a second aerobic culture of a second biological oxidizing means, said second culture employing constituents of said first effluent received into said second chamber as nutrients and receiving as seed microorganisms in activated sludge returned to said second chamber via said second activated-sludge-return means from said activated-sludge-separating means;

said activated-sludge-separating means receiving said second aerobic culture from said second chamber, said activated sludge separating in said activated-sludge-separating means by settling from said second aerobic culture in said activated-sludge-separating means, leaving a second effluent;

said first return means being employed to return a first portion of the activated sludge from said activated-sludge-separating means to said first chamber to provide microorganisms as seed for said first aerobic culture in said first chamber;

said second return means being employed to return a second portion of the activated sludge from said activated-sludge-separating means to said second chamber to provide microorganisms as seed for said second aerobic culture in said second chamber; and said fluid discharging means being employed to discharge at least a portion of said second effluent from said activated-sludge-separating means to outside the system, said second effluent so discharged to outside the system being the treated wastewater.

In an embodiment of this method of the inventions wherein an aqueous solution comprising a ferric salt, such as ferric sulphate, ferric alum or ferric chloride, is combined with said first aerobic culture received into said float sludge separating means, a treated wastewater can be produced which also has a substantially lower concentration of phosphate than the contaminated wastewater treated by the method of the invention. In such an embodiment, the float sludge separating means comprises a means for combining, with said first aerobic culture received into the float sludge separating means, an aqueous solution comprising such a ferric salt. This means, for combining with first aerobic culture an aqueous solution of a ferric salt, can be the same as or separate from the means for combining with such culture the flocculating polymer. The aqueous ferric salt solution and flocculating polymer can be combined simultaneously or separately with the first aerobic culture. In one embodiment, aqueous ferric salt solution and flocculating polymer can be combined with first aerobic culture in a single mixing chamber, although the ferric salt solution and flocculating polymer are introduced into the mixing chamber through separate inlets or conduits, which, in turn, are different from the inlet or conduit through which first aerobic culture enters the mixing chamber.

In the method of the invention, flocculating polymer and, if employed, aqueous ferric salt solution will preferably be added continuously to a system of the invention for mixing or combination with first aerobic culture.

By "substantially lower" with reference to BOD, suspended solids, and phosphate removal by the method of the invention is intended removal of at least 50%. As described elsewhere herein, removal of at least 80% is easily achieved with the method and removal in excess of 99% can be achieved.

As used herein and as generally known in the art, the terms "activated sludge circuit" or "activated sludge process" or "activated sludge plant" refer to a system in which biologically active growths are continuously circulated with incoming biodegradable waste in the presence of oxygen. The term "aeration" means the supplying of air (or air-oxygen or commercially pure oxygen) with adequate intensity to mix the fluid contents of a container or tank and to supply the oxygen to bacteria or other types of microorganisms in the container for biological oxidation to occur. The term "settleable sludge" as used herein and as generally known in the art, refers to floc or sludge due to biological activity and any other settleable matter which has a density greater than the density of the liquid in which it is suspended. The term "float sludge" refers to a sludge which has a low density compared to the density of the liquid in which it is suspended. The term "biological oxidation" refers to the oxidation of organic matter by microorganisms as their food and for their growth. The terms "detention" ("detain" or "detaining") or "detention period" refer to the time required to displace the contents of a tank or unit at a given rate of discharge.

FIG. 1 schematically illustrates a treatment system according to the present invention in which the treatment system, generally designated 10, includes an aeration tank 14, a dissolved air floatation unit 16 and a unit 18 which comprises an extended aeration unit 31 and a clarifier 19. Optionally, the system also includes a grease trap 12.

An inlet line 20 delivers wastewater (influent) to grease trap 12. As seen in FIG. 2, grease trap 12 is a small skimming tank or chamber of generally rectangular shape with an opening or inlet 21 in an upright wall near the bottom operatively connected to intake line 20 through which the wastewater enters. Trap 12 also has an outlet 23 located on a wall opposite inlet 22, at a position near the bottom of the trap 12, through which wastewater exits from trap 12 and is conveyed to tank 14 via a line 22. The surface layer of water and surface floating substances are collected by conventional techniques, such as, for example, suction (not shown).

Figure 7:
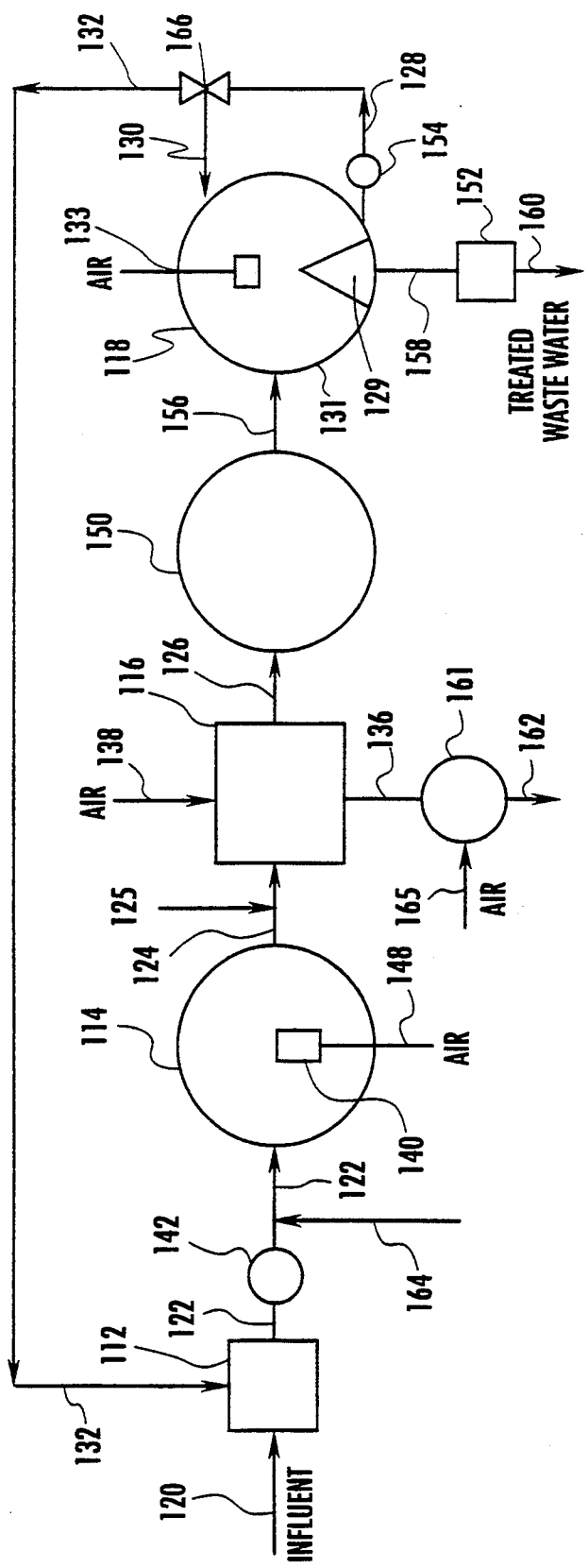
FIG. 7 is a schematic diagram illustrating a second embodiment of the treatment system according to the present invention.

Prior to entry of line 22 into tank 14, a line 32 joins line 22. Line 32 conveys activated sludge from clarifier 19, as described in detail hereinafter. The mix of wastewater and activated sludge (mixed liquor) is pumped to tank 14 by a pump 42. Alternatively, as best seen in FIG. 7, line 32 (line 132 in FIG. 7) can enter directly into grease trap 12.

As explained hereinafter, tank 14 (a "first chamber" in a system of the invention) contains a first aerobic culture of microorganisms which is capable of removing BOD from the wastewater. The culture of microorganisms is capable of biologically oxidizing constituents in the wastewater, by using constituents of the wastewater entering tank 14 as nutrients. The culture is seeded by feeding or "recycling" part of the activated sludge from clarifier 19 to tank 14, i.e., the returned activated sludge provides seed microorganisms for the culture in tank 14.

As best seen in FIGS. 3 and 4, the aeration tank 14 is suitably substantially cylindrical with top 43 that is open (to the atmosphere), a bottom 45 with a diameter 39 and cross-section 37, and a sidewall 41 with a height 49. A portion 44 of line 22 extends over the top 43 in such a manner that an end 46 of line 22 extends into tank 14, approximately in the center of the top portion of tank 14. The fluid from line 22 is discharged into tank 14 through end 46. Tank 14 has an outlet 47 which is located in the upright sidewall near bottom 45. Outlet 47 is operatively connected to a line 24.

The tank 14 is suitably configured to have a ratio of radius to maximum depth of fluid aerated in the tank that is greater than 1. The tank, thus, has a substantially large cross-sectional area. For example, for a milk-processing facility that produces about 90,000–100,00 gallons/day of wastewater with a $BOD_5$ of about 1200–8,000 mg/l and average suspended solids of about 3500–5000 mg/l, tank 14 is suitably an approximately 200,000 capacity tank whose height 49 is 20 ft., diameter 39 is 41.3 ft. and cross-section 37 has an area of 1332 $ft^2$.

An aerator, such as an array 40 of diffusers 50, supplies air (or air enriched oxygen, or commercially pure oxygen) into tank 14 from a supply (not shown) of compressed air provided by a compressor, blower or a pump (not shown). For example, a standard 50 horsepower blower is suitable to supply air through an array of diffusers to aerate up to at least 150,000 gallons of fluid in a cylindrical tank 39 ft. in diameter, when the diffusers are 1–2 ft. above the bottom of the tank. Diffusers 50 are suitably constructed of a coarse or fine porous material, such as a metal pipe with holes of suitable diameter along its periphery serving as pores, to produce substantially small bubbles of air in the culture fluid as the air passes from the diffusers into the fluid. The array 40 is located about 1 to 2 ft above the bottom 45. As shown in FIG. 4, the array 40 covers substantially the entire area of cross-section 37 of the bottom 45 of tank 14.

The illustrated array 40 comprises three heads, two shorter heads 53 which are positioned proximate the sides of tank 14, and one longer head 55 positioned substantially along a diameter across the middle of the bottom 45 of tank 14. The heads are connected to a line 48 which is in turn connected to a supply (not shown) of compressed air provided by a pump, compressor, or blower or the like (not shown). The heads 53 and 55 each have a plurality of diffusers, e.g., 51, 52 and 56. For the example of the 200,000 gallon capacity for tank 14 described hereinbefore, heads 53 suitably have 12 diffusers per head and head 55 suitably has 28 diffusers. The large cross-sectional area of tank 14 allows a large array of diffusers, permitting extensive aeration of the fluid in tank 14.

The large cross-sectional area of tank 14 also allows a large surface area of the fluid in the tank 14, and hence, also provides surface aeration for the culture fluid in the tank, assisted by agitation of the fluid caused by input of pressurized air bubbles from the diffusers. Alternatively, or additionally, an agitator or stirrer (not shown) in tank 14 can effect aeration by further increasing agitation of the surface of the water exposed to the ambient air.

Figure 5:
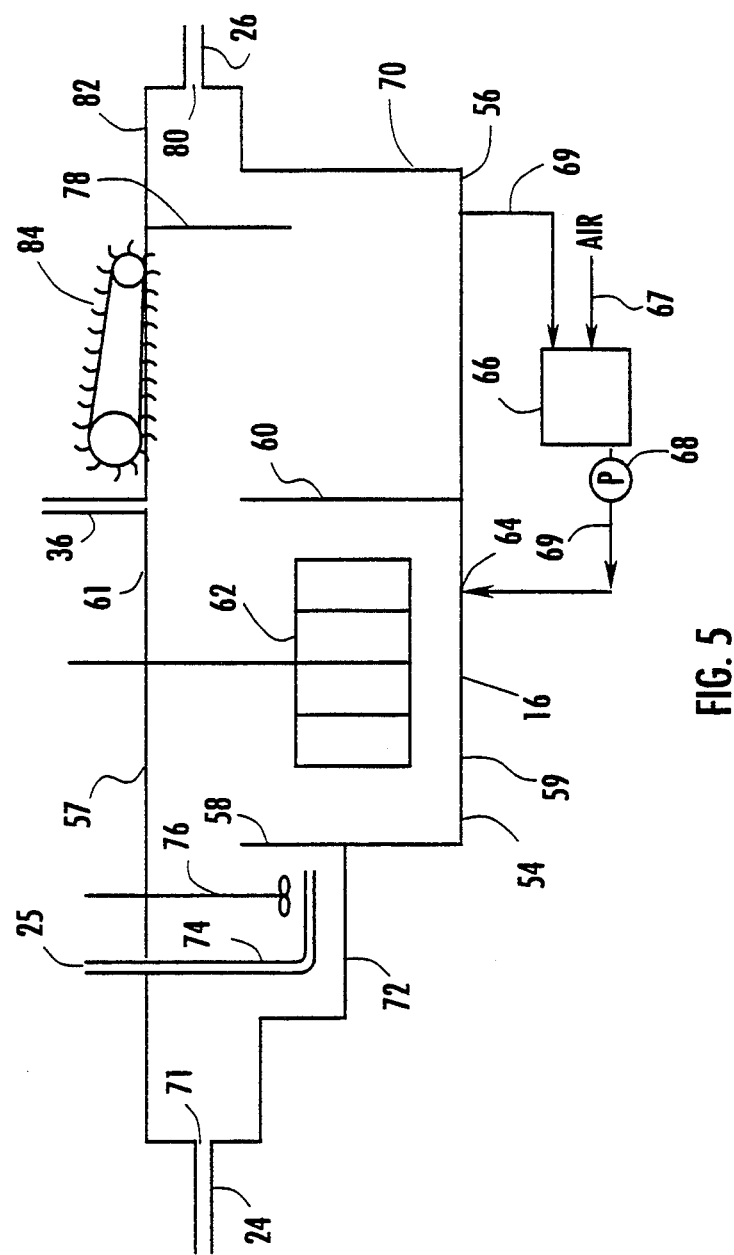
FIG. 5 is a schematic sectional view of a dissolved air floatation unit, including a float-sludge-separating means and a sludge-removing means, in a system in accordance with the present invention.

Line 24 connects aeration tank 14 to dissolved air floatation (DAF) unit 16. The capacity of this unit (volume of culture fluid processed per day) will preferably be about 1.5 times the average daily quantity of wastewater received into the system. Referring to FIG. 5, floatation unit 16, which comprises a float-sludge-separating means of a system of the invention, is a tank 57 having a substantially rectangular bottom 59, an open top 61, an inlet 71 and an outlet 80. Floatation unit 16 has a flocculation chamber 54, which includes a means for supplying a flocculating polymer, as described below, and a floatation chamber 56 separated by a baffle 60. Flocculation chamber 54 has, at the end of a line 69, a pressurized water inlet 64 through which wastewater from floatation chamber 56 is recycled, mixed with injected air 67 in a mixer 66 and pumped via a pump 68 to enter flocculation chamber 54 through inlet 64 at the bottom 59. The release of the pressurized water into flocculation chamber 54 forms small air bubbles which aerate the fluid in the chamber and attach themselves to suspended particles and microorganism flocs, and float the particles to the surface to form a float sludge, leaving a first effluent. Flocculation chamber 54 also has a paddle-type mixer 62 (a flocculator), driven by a motor (not shown) by which stirring and agitation of the fluid in the chamber 54 is effected, increasing aeration as well as the chances of contact between small particles and flocs to cause large flocs.

The float sludge is removed, via a float sludge-removal means, comprising in this embodiment a conventional skimmer 84 and a line 36, by which the sludge is conveyed away from dissolved air floatation unit 16. The float sludge can be disposed of by land application or the like. For convenience, the float sludge can also be maintained in a sludge tank (a sludge storage means) and disposed of periodically. To insure maintenance of aerobicity of the sludge, the sludge is aerated during the storage period by an aeration means (e.g., a line connected to a pump, compressor, or blower, or the like and through which air is supplied to the sludge tank). A baffle 78 prevents sludge from mixing with the first effluent, which exits unit 16 via outlet 80.

Prior to entry of the first aerobic culture from tank 14 into floatation unit 16, a flocculating or coagulating agent is added to the mix to improve coagulation, i.e., produce large floc size, and thereby enhance float sludge formation. The flocculating agent is suitably added directly in line or as illustrated in FIG. 5, added through line 25 to a flash mixing chamber 72 in which mixing or agitation is provided by a rotating impeller or stirrer 76 (driven by a motor, not shown). Baffle 58 separates mixing chamber 72 from flocculating chamber 54. In an embodiment, where an aqueous solution of a ferric salt is combined with first aerobic culture to achieve phosphate removal, said ferric salt solution will be added up-stream of chamber 16 and may be added in-line or into a mixing chamber, such as a flash-mixing chamber, as indicated with 72 in FIG. 5. The addition of ferric salt solution may be through the same tube, pipe or conduit, illustrated as 25, as flocculating or coagulating polymer, or, more preferably, through a different tube, pipe or conduit (not shown) in close proximity to that through which the flocculating or coagulating polymer is introduced.

It has been found that, with dairy or milk-processing wastewater, and a first culture aerated thoroughly as described above in the first aeration tank to an oxygen concentration above 2 mg/l (e.g., 3-4 mg/l) and with suspended solids less than about 2500 mg/l (1200-2400 mg/l) and a $BOD_5$ of less than about 6000 mg/l (e.g., 2500-6000 mg/l), suitable flocculating agents are of the polyelectrolyte polymer type, preferably polycation, with between about $3 \times 10^{-5}$ and about $5 \times 10^{-5}$ lbs. of polymer being required for each gallon of fluid entering the flotation unit. The polymer can be a polyanion or polycation, or combination of both, but a polycation is preferred. Cationic polymers include Calgon E 2076, manufactured by Calgon Corporation, and Tetrolite TFL 362, manufactured by Petrolits Corporation. A polycationic polymer, Nalco 7152, manufactured by Nalco Chemical Company, has been found to be particularly useful. Many suitable polyelectrolytes are available. A polyelectrolyte suitable for a particular system can be readily ascertained by the standard "jar test" for evaluating polymers for sludge-forming ability with a particular first culture.

An aqueous solution of ferric chloride, a ferric alum or ferric sulfate may be employed in embodiments of the invention, in which a ferric salt solution is combined with first aerobic culture in order to reduce the phosphate concentration of treated wastewater produced by a system of the invention. An aqueous solution of ferric sulfate is preferred for such use. The ferric sulfate solution may (and preferably will) include a polyelectrolyte polymer (preferably a polycationic polymer). A suitable solution, which is sold by Nalco Chemical Company (Naperville, Ill., USA) under the trademark FERRALYTE 8130, is greater than 40% (w/w) ferric sulfate and includes a cationic polyamine polymer. Another, less preferred, solution has no polyelectrolyte polymer but between 40% and 50% (w/w) ferric sulfate and is sold by Nalco Chemical Company under the trademark FERRALYTE 8131. In a waste treatment system as described in the immediately preceding paragraph, in which approximately 102 gallons per day of wastewater with a phosphate concentration of 50-150 ppm is input into the system, 5-6 gallons per day of FERRALYTE 8130 is sufficient to reduce the phosphate concentration of the first effluent, from the float sludge separator, to below 5 ppm (typically 2-4 ppm) and the phosphate concentration of the second effluent (the treated wastewater, which may be discharged to the environment) to less than 1 ppm and down to as low as 0.2 ppm. Thus, with the phosphate concentration of contaminated wastewater at about 100 ppm, between about 0.1 and 1.0 g of ferric sulfate per g of $PO_4^{-3}$ is added to the first aerobic culture to reduce phosphate concentration in second effluent (treated wastewater) to less than about 1 ppm.

Figure 6:
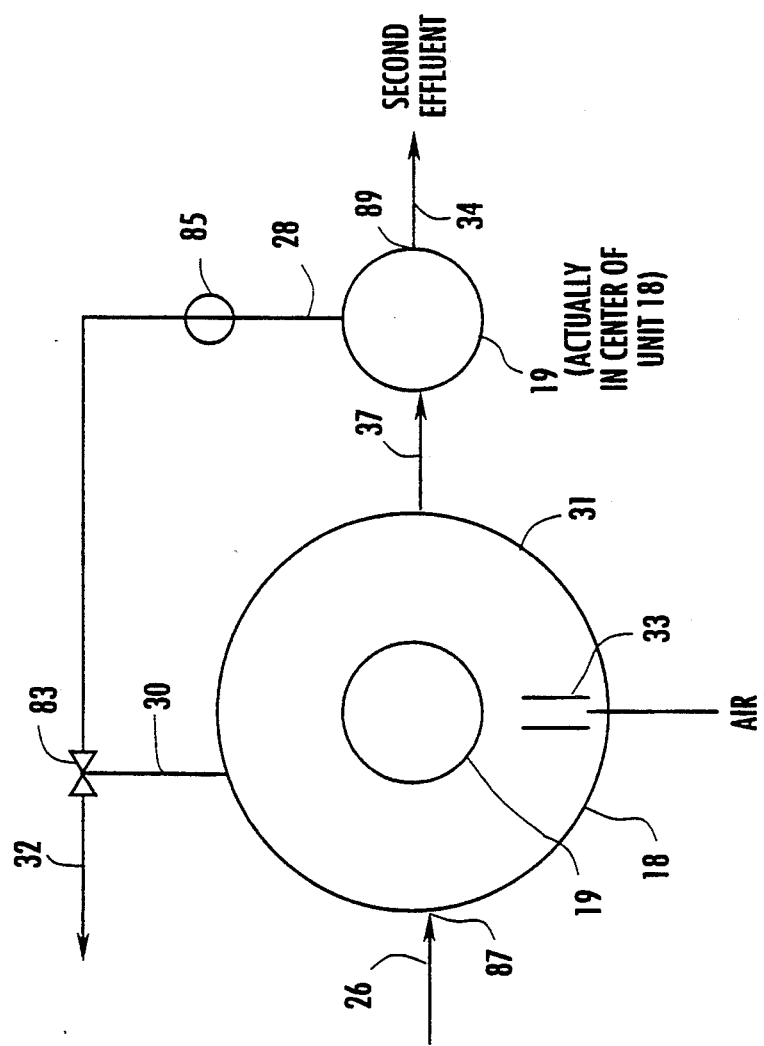
FIG. 6 is a schematic diagram of an extended aeration unit with clarifier, useful as a second chamber and an activated-sludge-separating means in a system in accordance with the present invention.

As best seen in FIG. 6, floatation unit 16 is operatively connected to unit 18 via a line 26 through which the first effluent issues from unit 16 and enters unit 18 through an inlet 87 located in an upright wall of unit 18. Unit 18 includes one portion which is an extended aeration tank (or second chamber of a system of the invention) 31 in which air is provided by an array 33 of diffusers near the bottom, substantially similar in arrangement, capacity and operation to the array 40 of diffusers 50 in tank 14, described hereinbefore, and another portion which is the clarifier 19 (activated sludge separator means) in which the settleable, activated sludge is separated from the second culture held in tank 31, leaving a second effluent. As used herein, the terms "extended aeration" and "extensively aerated" are meant to refer to aeration with biological oxidation for a period of 24 hours or more of a wastewater with an organic loading of up to about 200 mg/l to about 400 mg/l in $BOD_5$, i.e., basically a digestion within an aeration system, as understood in the art.

Clarifier 19 is suitably positioned in the center of unit 18 in fluid communication with tank 31. (For clarity, in FIG. 6, clarifier 19 is shown separately from unit 18.) Such communication, represented by 37 in FIG. 6, is suitably baffled inlets from tank 31 to clarifier 19, as is known in the art. The second effluent from clarifier 19 is drawn off via a line 34 through an outlet 89 and conveyed to a stream, lake, pond, ditch or the like. The settleable, activated sludge in clarifier 19 is drawn off the bottom of clarifier 19 into a line 28. By use of a valve 83, a first portion of the sludge formed is returned to tank 31 by action of a pump 85 via a portion 30 of line 28 while a second portion of sludge is fed via line 32 to enter into tank 14. If desired, clarifier 19 may be a separate unit from tank 18, in which case the culture from tank 31 will be discharged through a line to a clarifier 19.

In operation, wastewater influent is conveyed to grease trap 12 where surface oils, fats and grease are removed, as understood in the art, while the remaining fluid flows out to the first (aeration) chamber, which comprises the aeration tank 14. Activated sludge formed in the second aeration chamber and separated in clarifier 19 is mixed with fluid in, or issuing from, grease trap 12 to seed tank 14, i.e., the activated sludge serves an inoculum for the first aerobic culture in tank 14. The aerobic culture of tank 14 is aerated by air delivered at a pressure slightly exceeding the hydrostatic pressure due to the depth of the fluid in the tank. (The pressure of air delivery is automatically, continuously regulated by means available in the art (not shown in the drawings)). This prevents back-up of wastewater from the tank and assures delivery of air throughout the contents of the tank. The discharge pressure of air from the diffusers is typically about 2 p.s.i.g to about 7 p.s.i.g depending on the depth of fluid in the tank. Air (oxygen) is also supplied by surface aeration due to the large surface area of the fluid within the tank 14 and the movement of the surface water accompanying the pressurized air input from the diffusers. The average detention time for the first aerobic culture in the tank 14 is about 12 to 24 hours, during which time the microorganisms feed, and grow aerobically using nutrients provided by the wastewater entering the tank. The oxygen concentration in the first aerobic culture reaches typically greater than 2 mg/l to about 8 mg/l, and is usually about 3 mg/l to about 5 mg/l. The dissolved oxygen concentration substantially matches or exceeds the oxygen demand of the microorganisms. The $BOD_5$ in the first aerobic culture is typically about 2500 mg/l to about 6000 mg/l and the amount of suspended solids is from about 1200 mg/l to about 2400 mg/l.

At a point just prior to entry into floatation unit 16 (a float sludge separating means), a coagulating or flocculating agent is mixed with the culture fluid issuing from tank 14. Fluid enters floatation unit 16 where the fluid encounters bubbles of air rising from diffusers in the bottom of the floatation unit 16. Suspended matter and microorganisms are carried by the rising bubbles to the top of the unit 16 to form a float sludge. The float sludge is skimmed from the surface of the fluid by unit 84 (a float sludge removal means) and removed through line 36 for ultimate disposal on land or the like, leaving the first effluent to pass to tank 31 of unit 18. The float sludge is produced as an aerobic sludge, with little or no offensive odor, and is preferably maintained as such with aeration as necessary until ultimate disposal.

The first effluent exits floatation unit 16 and is conveyed to second chamber 31 of unit 18 where it is again aerated and in which is established a second aerobic culture of microorganisms which feed aerobically upon the constituents of the first effluent. The capacity of unit 18 is preferably about 1.5 times the average daily inflow of wastewater into the system. The detention period for the second aerobic culture is typically about 24 to about 96 hours. In the second aerobic culture, the amount of suspended solids is from about 2500 mg/l to about 4000 mg/l and the $BOD_5$ is from about 1200 mg/l to about 3600 mg/l. The sludge formed from the second aerobic culture is a settleable, activated sludge and is by settling separated from the second effluent in clarifier 19 (an activated sludge separating means). This activated sludge has suspended solids in a range of about 2500 mg/l to about 5000 mg/l and the $BOD_5$ is between about 2000 mg/l to about 4000 mg/l. The sludge is preferably continually drawn off the clarifier 19, so that none accumulates (and problems of denitrification of the sludge are avoided) and the second effluent, left after settling of the activated sludge, is drawn off and passed or drained to a subsequent treatment system or, if acceptable, environmentally to a stream, river, lake or the like. A portion (usually more than 90%) of the activated sludge is returned to the extended aeration tank 31 as an inoculum for the second aerobic culture. While some activated sludge can be removed from the system, preferably and advantageously it will all be fed back to tank 14 or recycled to tank 31.

With treatment of dairy or food-processing waste in a system of the invention, usually about 5% to about 15%, and more typically about 10%, of the activated sludge produced during any 24-hour period in clarifier 19 is returned ("wasted") from the clarifier via line 32 and line 22 to tank 14 for seeding the culture in tank 14. The fraction of activated sludge returned to tank 14 is controlled by valve 83 (FIG. 6), which may be any standard valve known in the art, such as an airlift valve or a gate valve, with which an incoming stream of fluid can be adjustably separated into two outflowing streams. The fraction of activated sludge returned to tank 14 from unit 19 is adjusted during continuous operation of the system to maintain the suspended solids (settleable solids) in the second aerobic culture in tank 31 in a steady-state range of from about 2500 mg/l to about 4000 mg/l and more preferably near a steady state value of about 3000 mg/l. The return of activated sludge may be continuous during operation of the system, with adjustment manually or automatically from time to time to maintain the level of settleable solids in the second aerobic culture in the desired steady-state range or near the desired steady-state value. With continuous return, between about 5% and about 15%, and usually about 10%, of the activated sludge will be returned from unit 14 to tank 14 at any point in time. Alternatively, the return of activated sludge to tank 14 may be sporadic. In sporadic return, no activated sludge is being returned to tank 14 during some periods of time and, during periods in which return is occurring, between about 25% and about 50%, and typically closer to 50%, of the activated sludge is being returned to tank 14. With sporadic return, as with continuous, the goal is to maintain the level of settleable solids in the second aerobic culture in tank 31 in the range of 2500–4000 mg/l and more preferably near the value of 3000 mg/l. For example, during a typical day with sporadic return, about 50% of the activated sludge will be returned to tank 14 during a two-hour period early in the morning, about 50% of the activated sludge will be returned to tank 14 during another two-hour period late in the afternoon or early in the evening, and no activated sludge will be returned to tank 14 at other times.

Virtually all systems utilizing an activated sludge circuit depend upon the establishment and maintenance of the natural microflora in the water. As explained hereinbefore, dairy or milk-processing wastewater contains filamentous bacteria of species of the Sphaerotilus-Leptothrix group, which are known for their bulking properties, and a high carbohydrate concentration, which encourages the growth of these bacteria. The system of the present invention utilizes dissolved air floatation as a first clarification method to produce and separate a float sludge from the first aerobic culture issuing from the first aeration chamber. The float sludge produced is enhanced due to the bulking tendencies of the bacteria. Thus, the system works with the bacterial action and takes advantage of it. In addition, rising sludge is also well tolerated and used to enhance the system. Although dissolved air floatation has been described in the art as not particularly efficient, in the system of the present invention, floatation clarification results surprisingly in an effluent which has a $BOD_5$ of about 100 mg/l to about 300 mg/l, about 0.05 of the $BOD_5$ of the first culture, and suspended solids of about 100 mg/l to about 250 mg/l, about 0.1 of the suspended solids of the first culture.

The use of a relatively shallow aeration tank with diffusers covering substantially the entire cross section of the tank facilitates highly efficient aeration of the first culture. Surface aeration is also enhanced due to the relatively large surface area of the fluid in the tank. Such aeration permits an exit dissolved oxygen concentration of greater than 2 mg/l up to about 8 mg/l. This high degree of aeration virtually eliminates the concentration of oxygen as a rate-determining factor in the BOD removal. Those skilled in the art will understand that this high degree of aeration can be accomplished by other methods, such as using diffusers at different depths in the tank. Such methods provide little advantage over design of the aeration tank of the present invention. The aeration tank of the present invention provides a simple, minimal component, space saving (due to the cylindrical shape compared to rectangular tanks described in the prior art) aeration unit.

The efficiencies of the first aeration and the first clarification provide as high as about a 95% to about a 98% reduction in $BOD_5$ and the suspended solids of the influent water, by the time it exits the floatation unit clarifier. The second aeration and second clarification can yield a treated wastewater with a pH of about 7.1 to about 7.4, an environmentally acceptable range, and a concentration of suspended solids of less than 0.1% of the concentration in the first aerobic culture and a BOD of less than 0.1% of the BOD of the first aerobic culture. A treated wastewater with such a pH and level of suspended solids and $BOD_5$ may be suitable for environmental discharge, having substantially complete BOD removal, i.e., suspended solids of less than 5 mg/l and a BOD of less than 5 mg/l. Alternatively, the effluent from the floatation unit or the second aeration chamber can be discharged to another (i.e., municipal) system for further treatment.

Referring now to FIG. 7, the system according to the present invention can comprise other components. In the illustrated embodiment, the system includes a grease trap 112 which receives wastewater influent from a wastewater source via a line 120. Activated sludge from a downstream clarifier 129 is conveyed via a line 132 and mixed with the fluid in grease trap 112. The combined wastewater and activated sludge (mixed liquor) is pumped by the action of pump 142 via a line 122 to a first aeration chamber 114. The pH of the mixed liquor is sampled in chamber 114 (not shown) and pH is adjusted to alkaline, typically about pH 8 to pH 9, via addition of aqueous base or acid (usually sulfuric acid) through a pH adjustment line 164. The aerobic culture in chamber 114 is aerated with an array 140 of diffusers substantially similar, in arrangement, capacity and operation, to those described hereinbefore, supplied by air from a blower (not shown) through line 148. The first aerobic culture is conveyed via a line 124 to a dissolved air floatation unit 116, as described above, where a float sludge is produced and separated from a first effluent as described hereinbefore. The first aerobic culture is mixed with a flocculating agent, which is added through line 125; and air is supplied to the unit through line 138, as described hereinbefore. The float sludge is removed from unit 116 via a line 136 and stored with aeration via an air line 165 in a sludge tank 161 for removal eventually through line 162. The first effluent is drawn off unit 116 via a line 126 to a trickling filter tower 150 in which aerobic degradation takes place substantially as described hereinbefore. The fluid from the trickling filter tower 150 is conveyed to a second chamber 131 of unit 118 via a line 156. Unit 118 is a combined aeration tank 131 and clarifier 129 as described hereinbefore. A second aerobic culture is present in chamber 131 and is clarified in clarifier 129 into a settleable, activated sludge and a second effluent. The second effluent is passed through line 158 to a sand filter 152, in which filtration occurs, and then emerges via a line 160 to be disposed into the environment. The sludge from clarifier 129 is pumped by action of a pump 154 via line 128 to a valve 166 where the activated sludge can be directed to the aeration tank 131 and the aeration chamber 114 to serve as inocula for the cultures in these chambers. An aqueous ferric salt solution can also, like flocculating polymer, be input into the system through a line (not shown), in close proximity to line 125, such that, along with flocculating polymer, the ferric salt solution can be combined with first aerobic culture prior to that culture's entering dissolved air flotation unit 116.

While the invention has now been disclosed with reference to certain preferred embodiments and exemplified with regard thereto, those skilled in the art will appreciate the various substitutions, modifications, omissions and changes that may be made without departing from the spirit of the invention. Accordingly, it is intended that the scope of the present invention be limited solely by the broadest interpretation that can be accorded the appended claims.

I claim:

1. A wastewater treatment apparatus, comprising:

a first chamber, a float-sludge-separating means, a float-sludge-removing means, a second chamber, an activated-sludge-separating means, a first activated-sludge-return means; a second activated-sludge-return means; and a fluid discharging means;

said first chamber (i) wherein wastewater from a wastewater source is received, (ii) and wherein fluid that enters said first chamber for a first detention period is detained, (iii) comprising a first aerating means for aerating fluid in said first chamber, and (iv) holding a first aerobic culture of a first biological oxidizing means, said first culture employing constituents of wastewater received into said first chamber as nutrients and receiving as seed microorganisms in activated sludge returned to said first chamber via said first activated-sludge-return means from said activated-sludge-separating means;

said float-sludge-separating means receiving said first aerobic culture from said first chamber and comprising (i) means for combining a flocculating polymer with first aerobic culture received into said float-sludge-separating means, and (ii) a second aerating means for aerating fluid in said float-sludge-separating means and for providing air bubbles for separation of a float sludge from said combination of first aerobic culture and said flocculating polymer in said float-sludge-separating means, with the production of said float sludge from said combination, leaving a first effluent;

said float-sludge-removing means being a means for removing said float sludge from said float-sludge-separating means to outside the apparatus;

said second chamber (i) wherein said first effluent from said float-sludge-separating means is received, (ii) and wherein fluid that enters said second chamber for a second detention period is detained, (iii) comprising a third aerating means for aerating fluid in said second chamber, and (iv) holding a second aerobic culture of a second biological oxidizing means, said second culture employing constituents of said first effluent received into said second chamber as nutrients and receiving as seed microorganisms in activated sludge returned to said second chamber via said second activated-sludge-return means from said activated-sludge-separating means;

said activated-sludge-separating means receiving said second aerobic culture from said second chamber, said activated sludge formed from separation in said activated-sludge-separating means by settling from said second aerobic culture in said activated-sludge-separating means, leaving a second effluent;

said first return means being a means for returning a first portion of the activated sludge from said activated-sludge-separating means to said first chamber to provide microorganisms as seed for said first aerobic culture in said first chamber;

said second return means being a means for returning a second portion of the activated sludge from said activated-sludge-separating means to said second chamber to provide microorganisms as seed for said second aerobic culture in said second chamber; and said fluid discharging means being a means for discharging at least a portion of said second effluent from said activated-sludge-separating means to outside the apparatus.

2. The apparatus of claim 1, wherein said first and second portions of said activated sludge are together substantially all of the activated sludge formed in said activated-sludge-separating means; wherein at least about 90% of second effluent from said activated-sludge-separating means is discharged to outside the apparatus; and wherein, in said discharged second effluent, the concentration of suspended solids is less than about 20% of the concentration of suspended solids in said first aerobic culture and the BOD is less than about 20% of the BOD of said first aerobic culture.

3. The apparatus of claim 1 which comprises additionally a float-sludge-storing means, for receiving float sludge via the float-sludge-removing means from the float-sludge-separating means and holding until removed from the apparatus said float sludge so received, said float-sludge-storing means comprising a fourth aerating means for aerating float sludge held in said float-sludge-storing means to maintain said float sludge so held as aerobic sludge until removal from the apparatus.

4. The apparatus of claim 3 which comprises additionally a grease-trapping means for receiving wastewater from the wastewater source and removing fat-based substances from the wastewater prior to entry of the wastewater into said first chamber.

5. The apparatus of claim 4 wherein the first return means delivers the activated sludge returned from said activated-sludge-separating means into wastewater in said grease-trapping means, whereupon a combination of said activated sludge and wastewater passes from said grease-trapping means into said first chamber.

6. The apparatus of claim 4 which comprises additionally (i) a means for aerating said first effluent prior to receipt of said first effluent into said second chamber and (ii) means for filtering said second effluent prior to discharge of said second effluent to outside the apparatus.

7. The apparatus of claim 6 wherein (i) said second chamber is an extended aeration chamber; (ii) said activated-sludge-separating means is a clarifier; (iii) said means for aerating said first effluent prior to receipt of said first effluent into said second chamber is a trickling filter tower; and (iv) said means for filtering said second effluent prior to discharge to outside the apparatus is a sand filter.

8. The apparatus of claim 4 wherein the wastewater source is a food-processing plant.

9. The apparatus of claim 8 wherein the wastewater source is a milk-processing plant.

10. The apparatus of claim 9 wherein said first and second biological oxidizing means comprise filamentous bacteria of species selected from the Sphaerotilus-Leptothrix group.

11. The apparatus of claim 10 wherein the pH of said first aerobic culture is from about 8 to about 9.

12. The apparatus of claim 11 wherein, in the first aerobic culture, the amount of suspended solids is from about 1200 mg/l to about 2400 mg/l and the $BOD_5$ is from about 2500 mg/l to about 6000 mg/l; in the second aerobic culture, the amount of suspended solids is from about 2500 mg/l to about 4000 mg/l and the $BOD_5$ is from about 1200 mg/l to about 3600 mg/l; and in the activated sludge, the amount of suspended solids is between about 2500 mg/l and about 5000 mg/l and the $BOD_5$ is between about 2000 mg/l and about 4000 mg/l.

13. The apparatus of claim 8 wherein said first and second biological oxidizing means comprise filamentous bacteria of species selected from the Sphaerotilus-Leptothrix group.

14. The apparatus of claim 4 wherein the wastewater source is a food-processing plant.

15. The apparatus of claim 14 wherein the wastewater source is a milk-processing plant.

16. The apparatus of claim 15 wherein said first and second biological oxidizing means comprise filamentous bacteria of species selected from the Sphaerotilus-Leptothrix group.

17. The apparatus of claim 16 wherein the pH of said first aerobic culture is from about 8 to about 9.

18. The apparatus of claim 14 wherein said first and second biological oxidizing means comprise filamentous bacteria of species selected from the Sphaerotilus-Leptothrix group.

19. The apparatus of claim 1 wherein said first and second biological oxidizing means comprise filamentous microorganisms.

20. The apparatus of claim 1 wherein, in the first aerobic culture, the amount of suspended solids is from about 1200 mg/l to about 2400 mg/l and the $BOD_5$ is from about 2500 mg/l to about 6000 mg/l; in the second aerobic culture, the amount of suspended solids is from about 2500 mg/l to about 4000 mg/l and the $BOD_5$ is from about 1200 mg/l to about 3600 mg/l; and in the activated sludge, the amount of suspended solids is between about 2500 mg/l and about 5000 mg/l and the $BOD_5$ is between about 2000 mg/l and about 4000 mg/l.

21. The apparatus according to any one of claims 1–20 wherein the concentration of dissolved oxygen in said first aerobic culture is from greater than 2 mg/l to about 8 mg/l.

22. The apparatus according to any one of claims 1–20 wherein the float-sludge-separating means comprises a means for combining an aqueous solution of a ferric salt with first aerobic culture received into said float-sludge-separating means.

23. The apparatus according to claim 22 wherein the concentration of dissolved oxygen in said first aerobic culture is from greater than 2 mg/l to about 8 mg/l and the concentration of phosphate in said first aerobic culture is from about 50 mg/l to about 100 mg/l.

24. The apparatus of claim 1, further comprising:
a first conveying means for inputing wastewater into said first chamber from the wastewater source;
a second conveying means for passing first aerobic culture from said first chamber to said float-sludge-separating means; and
a third conveying means for passing said first effluent to said second chamber.

25. The apparatus of claim 1, wherein the first chamber comprises a tank which is substantially cylindrical, has a top end substantially completely open to the atmosphere, and has a ratio of radius to maximum depth of wastewater detained in the tank that is greater than 1.

26. The apparatus of claim 25, wherein said first aerating means comprises an array of diffusers substantially covering the bottom cross-sectional area of said tank.

27. The apparatus of claim 26, wherein said diffusers have a pressure delivery capacity of about 2 p.s.i.g to about 7 p.s.i.g.

28. The apparatus according to any one of claims 24–27 wherein the float-sludge-separating means comprises a means for combining an aqueous solution of a ferric salt with first aerobic culture received into said float-sludge-separating means.

29. A method of treating a contaminated wastewater to provide a treated wastewater, which has a substantially lower concentration of suspended solids and substantially lower BOD than the contaminated wastewater, said method comprising passing the contaminated wastewater into a wastewater treatment apparatus, said apparatus comprising: a first chamber, a float-sludge-separating means, a float-sludge-removing means, a second chamber, an activated-sludge-separating means, a first activated-sludge-return means; a second activated-sludge-return means; and a fluid discharging means;

said first chamber (i) wherein wastewater from a wastewater source is received, (ii) and wherein fluid that enters said first chamber for a first detention period is detained, (iii) comprising a first aerating means for aerating fluid in said first chamber, and (iv) holding a first aerobic culture of a first biological oxidizing means, said first culture employing constituents of wastewater received into said first chamber as nutrients and receiving as seed microorganisms in activated sludge returned to said first chamber via said first activated-sludge-return means from said activated-sludge-separating means;

said float-sludge-separating means receiving said first aerobic culture from said first chamber and comprising (i) means for combining a flocculating polymer with first aerobic culture received into said float-sludge-separating means, and (ii) a second aerating means for aerating fluid in said float-sludge-separating means and for providing air bubbles for separation of a float sludge from said combination of first aerobic culture and said flocculating polymer in said float-sludge-separating means, with the production of said float sludge from said combination, leaving a first effluent;

said float-sludge-removing means being a means for removing said float sludge from said float-sludge-separating means to outside the apparatus;

said second chamber (i) wherein said first effluent from said float-sludge-separating means is received, (ii) and wherein fluid that enters said second chamber for a second detention period is detained, (iii) comprising a third aerating means for aerating fluid in said second chamber, and (iv) holding a second aerobic culture of a second biological oxidizing means, said second culture employing constituents of said first effluent received into said second chamber as nutrients and receiving as seed microorganisms in activated sludge returned to said second chamber via said second activated-sludge-return means from said activated-sludge-separating means;

said activated-sludge-separating means receiving said second aerobic culture from said second chamber, said activated sludge formed from separation in said activated-sludge-separating means by settling from said second aerobic culture in said activated-sludge-separating means, leaving a second effluent;

said first return means being a means for returning a first portion of the activated sludge from said activated-sludge-separating means to said first chamber to provide microorganisms as seed for said first aerobic culture in said first chamber;

said second return means being a means for returning a second portion of the activated sludge from said activated-sludge-separating means to said second chamber to provide microorganisms as seed for said second aerobic culture in said second chamber; and said fluid discharging means being a means for discharging at least a portion of said second effluent from said activated-sludge-separating means to outside the apparatus, said second effluent so discharged to outside the apparatus being the treated wastewater.

30. The method of claim 29, wherein said first and second portions of said activated sludge are together substantially all of the activated sludge formed in said activated-sludge-separating means; wherein at least about 90% of second effluent from said activated-sludge-separating means is treated water; and wherein, in said treated water, the concentration of suspended solids is less than about 20% of the concentration of suspended solids in said first aerobic culture and the BOD is less than about 20% of the BOD of said first aerobic culture.

31. The method of claim 30, wherein the rate of return of activated sludge from said activated-sludge-separating means to said first and second chambers is substantially the same as the rate of production of activated sludge by settling from second aerobic culture in said activated-sludge-separating means.

32. The method of claim 31 wherein between about 3% and about 7% of the activated sludge from the activated-sludge-separating means is returned to said first chamber.

33. The method of claim 29 wherein the treatment apparatus comprises additionally a float-sludge-storing means, for receiving float sludge via the float-sludge-removing means from the float-sludge-separating means and holding until removed from the apparatus said float sludge so received, said float-sludge-storing means comprising a fourth aerating means for aerating float sludge held in said float-sludge-storing means to maintain said float sludge so held as aerobic sludge until removal from the apparatus.

34. The method of claim 33 wherein the apparatus comprises additionally a grease-trapping means for receiving the contaminated wastewater from the contaminated wastewater source and removing fat-based substances from the contaminated wastewater prior to entry of the contaminated wastewater into said first chamber.

35. The method of claim 34 wherein the first return means delivers the activated sludge returned from said activated-sludge-separating means into contaminated wastewater in said grease-trapping means, whereupon a combination of said activated sludge and contaminated wastewater passes from said grease-trapping means into said first chamber.

36. The method of claim 34 wherein the apparatus comprises additionally (i) a means for aerating said first effluent prior to receipt of said first effluent into said second chamber and (ii) means for filtering said second effluent prior to discharge of said second effluent as the treated wastewater to outside the apparatus.

37. The method of claim 36 wherein, in the apparatus, (i) said second chamber is an extended aeration chamber; (ii) said activated-sludge-separating means is a clarifier; (iii) said means for aerating said first effluent prior to receipt of said first effluent into said second chamber is a trickling filter tower; and (iv) said means for filtering said second effluent prior to discharge to outside the apparatus is a sand filter, said method yielding treated wastewater with a concentration of suspended solids of less than 1% of said concentration in said first aerobic culture and a BOD of less than 1% of the BOD of said first aerobic culture.

38. The method of claim 34 wherein the contaminated wastewater source is a food-processing plant.

39. The method of claim 38 wherein the contaminated wastewater source is a milk-processing plant.

40. The method of claim 39 wherein said first and second biological oxidizing means comprise filamentous bacteria of species selected from the Sphaerotilus-Leptothrix group.

41. The method of claim 40 wherein the pH of said first aerobic culture is from about 8 to about 9.

42. The method of claim 41 wherein, in the first aerobic culture, the amount of suspended solids is from about 1200 mg/l to about 2400 mg/l and the BOD$_5$ is from about 2500 mg/l to about 6000 mg/l; in the second aerobic culture, the amount of suspended solids is from about 2500 mg/l to about 4000 mg/l and the BOD$_5$ is from about 1200 mg/l to about 3600 mg/l; and in the activated sludge, the amount of suspended solids is between about 2500 mg/l and about 5000 mg/l and the BOD$_5$ is between about 2000 mg/l and about 4000 mg/l.

43. The method of claim 42, wherein said first detention period is from about 12 hours to about 24 hours and said second detention period is from about 24 hours to about 96 hours.

44. The method of claim 38 wherein said first and second biological oxidizing means comprise filamentous bacteria of species selected from the Sphaerotilus-Leptothrix group.

45. The method of claim 29 wherein the contaminated wastewater source is a food-processing plant.

46. The method of claim 45 wherein the contaminated wastewater source is a milk-processing plant.

47. The method of claim 46 wherein said first and second biological oxidizing means comprise filamentous bacteria of species selected from the Sphaerotilus-Leptothrix group.

48. The method of claim 47 wherein the pH of said first aerobic culture is from about 8 to about 9.

49. The method of claim 45 wherein said first and second biological oxidizing means comprise filamentous bacteria of species selected from the Sphaerotilus-Leptothrix group.

50. The method of claim 29 wherein, in the apparatus, said first and second biological oxidizing means comprise filamentous microorganisms.

51. The method of claim 29 wherein, in the first aerobic culture, the amount of suspended solids is from about 1200 mg/l to about 2400 mg/l and the BOD$_5$ is from about 2500 mg/l to about 6000 mg/l; in the second aerobic culture, the amount of suspended solids is from about 2500 mg/l to about 4000 mg/l and the BOD$_5$ is from about 1200 mg/l to about 3600 mg/l; and in the activated sludge, the amount of suspended solids is between about 2500 mg/l and about 5000 mg/l and the $BOD_5$ is between about 2000 mg/l and about 4000 mg/l.

52. The method of claim 29 wherein said first detention period is from about 12 hours to about 24 hours and said second detention period is from about 24 hours to about 96 hours.

53. The method according to any of claims 29-43 wherein the concentration of dissolved oxygen in said first aerobic culture is from greater than 2 mg/l to about 8 mg/l.

54. The method of any of claims 29-43 wherein, in the wastewater treatment apparatus, the float-sludge-separating means comprises a means for combining an aqueous solution of a ferric salt with first aerobic culture received into said float-sludge-separating means and wherein an aqueous solution of a ferric salt is combined with first aerobic culture received into the float-sludge separating means.

55. The method of claim 54 wherein the ferric salt is selected from the group consisting of ferric sulfate, a ferric alum and ferric chloride.

56. The method of claim 55 wherein the ferric salt is ferric sulfate.

57. The method according to claim 56 wherein the concentration of dissolved oxygen in said first aerobic culture is from greater than 2 mg/l to about 8 mg/l and the concentration of phosphate in said first aerobic culture is from about 50 mg/l to about 100 mg/l.

58. The method according to claim 55 wherein the concentration of dissolved oxygen in said first aerobic culture is from greater than 2 mg/l to about 8 mg/l and the concentration of phosphate in said first aerobic culture is from about 50 mg/l to about 100 mg/l.

59. The method according to claim 54 wherein the concentration of dissolved oxygen in said first aerobic culture is from greater than 2 mg/l to about 8 mg/l and the concentration of phosphate in said first aerobic culture is from about 50 mg/l to about 100 mg/l.

* * * * *

UNITED STATES PATENT AND TRADEMARK OFFICE
CERTIFICATE OF CORRECTION

PATENT NO. : 5,364,529
DATED : November 15, 1994
INVENTOR(S) : Raymond N. Morin, et al.

It is certified that error appears in the above-indentified patent and that said Letters Patent is hereby corrected as shown below:

In Column 14, Line 59, "inventions" should be --invention--.

In Column 18, Line 26, "Petrolits" should be --Petrolite--.

In Column 18, Line 52, "102" should be --$10^5$--.

Signed and Sealed this

Twenty-sixth Day of March, 1996

Attest:

BRUCE LEHMAN

Attesting Officer     Commissioner of Patents and Trademarks